No. 724,265. PATENTED MAR. 31, 1903.
W. R. CUNNINGHAM.
ANTIFRICTION THRUST BEARING.
APPLICATION FILED FEB. 18, 1902.
NO MODEL.
Fig I
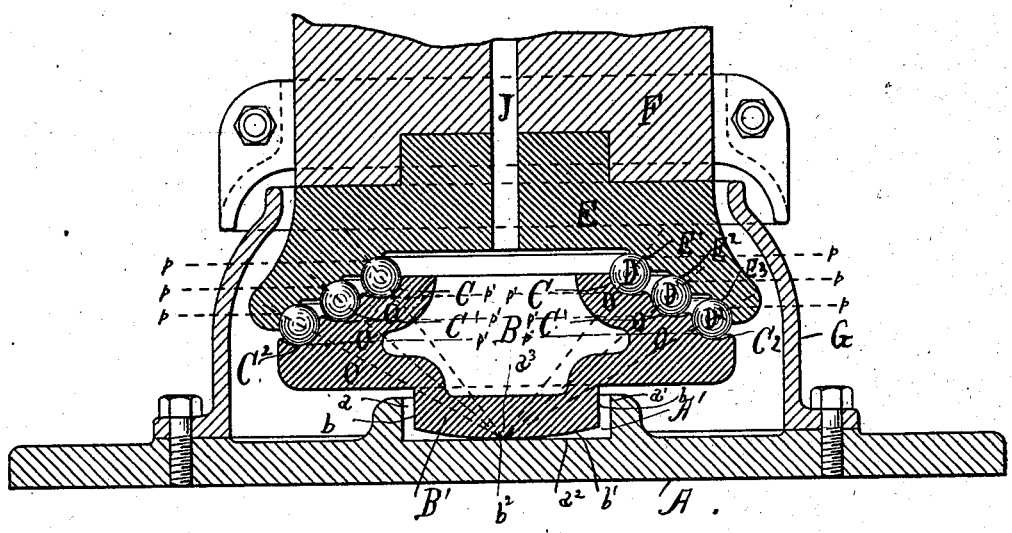
Fig II
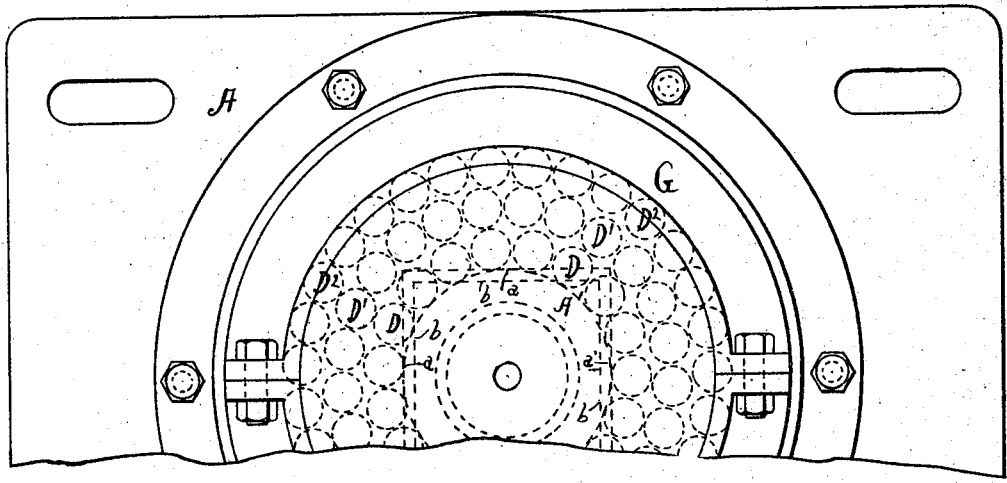
Witnesses:
A. L. Lord.
E. B. Donnelly.
Inventor:
William R. Cunningham
by W. E. Donnelly
his Atty

UNITED STATES PATENT OFFICE.

WILLIAM R. CUNNINGHAM, OF BUCYRUS, OHIO.

ANTIFRICTION THRUST-BEARING.

SPECIFICATION forming part of Letters Patent No. 724,265, dated March 31, 1903.

Application filed February 18, 1902. Serial No. 94,672. (No model.)

*To all whom it may concern:*

Be it known that I, WILLIAM R. CUNNINGHAM, a citizen of the United States, residing at Bucyrus, in the county of Crawford and State of Ohio, have invented certain new and useful Improvements in Antifriction Thrust-Bearings; and I hereby declare the following to be a full, clear, and exact description of the invention, such as will enable others skilled in the art to which it pertains to make and use the same.

My invention relates to antifriction step-bearings, and more especially such as are required to sustain heavy loads during the pivotal action of the step.

The objects of my invention are to provide a ball-bearing which has a greater bearing-surface on the ball; to provide a bearing-surface of the multiple-track type in which the several tracks are at different elevations, whereby two material advantages are attained—that of preventing the accumulation of grit with the lubricant-supply to the bearing, as between the balls and the track, and the sustaining of the lateral thrust, thus holding the shaft central while carrying the load; also, supporting the lower track in such a manner by forming its base convex and the bearing upon which said base rests plain that the bearing will equalize itself if from any cause the parts should settle from alinement or the shaft become strained or out of alinement.

A further object of my invention is to provide a bearing of the type set forth (a thrust-bearing) which may be used to sustain either horizontal or vertical thrusts and in either case have similar advantages.

The above objects are attained by providing each set of balls with its own center of revolution, which center is in the center of the plane through all the centers of the balls in such set, which insures a positive contact between the balls and the races and preventing slipping regardless of the degree of angle of contact between the tracks and balls, as will be hereinafter fully set forth.

My invention consists in providing what I term a "terraced bearing," the bearing-surfaces of which are successively at different elevations with each other and provided with intervening balls for each bearing; also, in so constructing the bearing that the stress-lines converge toward the pivotal portion of the bearing; also, in forming the "thrust-plate" of the bearing in such a manner, by means of convexing its base and resting the same upon a plain surface, that the thrust-plate while sustaining the load will automatically adjust itself to irregularities resulting from the settling of the machine or from strain resulting in the springing of the shaft, thus causing the parts to become out of alinement.

Further, my invention consists in forming the successive bearing-surfaces in combination with their series of balls in such a manner that the stress or weight is divided so as to be received by the thrust-plate in a vertical and horizontal direction or, more properly speaking, in a direction parallel with the axial line of the shaft and also at right angles to said line, whence the load is sustained equally by the series of tracks and balls without disturbing the relation between the parts to such an extent as to cause undue wear or cramping.

My invention further consists in features of construction, all of which tend to the accomplishing in a more perfect manner of the above results, which will be hereinafter fully set forth and claimed.

In the drawings, Figure I is a view in vertical section, taken through the axial line of a bearing constructed according to my invention. This figure also shows the stress-lines by means of dotted lines and the resultant effect of the several positions which will be assumed by the parts during the operation regardless of the angle of the contact between the several tracks and their balls to be hereinafter fully set forth. Fig. II is a plan view illustrating more particularly the distribution of the balls on their several tracks.

A represents a foundation-plate or supporting-plate which forms the base or support of the structure. This plate A is properly supported in any suitable manner in its proper relation to the bearing and has preferably attached to it a pocket A', which is polygonal in shape as regards the relation of its side walls *a a'* one to the other. This, however, is not essential, but is a matter of preferable construction.

Seated in the pocket A' is a thrust-plate B, the projection B' of which is formed in the shape of a boss having a diameter slightly less than the pocket A' and preferably of such shape as to correspond with the contour of said pocket at its side wall $b\ b$, the object being to allow the projection B' free play within the pocket A' and preferably prevent it from turning. The contacting surfaces or bearing-surfaces between the seating portion $a^2$ of the pocket A' and the bearing portion $b'$ of the projection B' is such that there is a rolling contact between the parts, which is preferably accomplished by forming the part $b'$ of the projection B' convex and the part $a^2$ of the pocket A' plain and allowing side play or a play at right angles to the axial line of the shaft between the two parts. This result, however, may be accomplished in other manner than that illustrated, which will be apparent to those skilled in the art. The thrust-plate B is formed with a series of tracks C C' $C^2$, disposed at different elevations. These tracks C C' $C^2$ are formed with curved seats of such contour as to adapt them to receive bearing-balls and to sustain said bearing-balls for a considerable portion of their periphery against any thrust substantially converging toward the points $a^3$ and $b^2$. These tracks C C' $C^2$ may be two, three, or more in number, as found necessary or advantageous, and are each supplied with a suitable number of bearing-balls D D' $D^2$, respectively.

E represents a step-plate, which is formed with a series of tracks E', $E^2$, and $E^3$ so disposed and shaped as to conform with the tracks C C' $C^2$, thus being at different elevations or depths and adapted to engage and be supported by the balls D, D', and $D^2$. The step-plate E is preferably formed separate from the shaft F, to which it is suitably connected, and may have hardened or chilled bearing-surfaces; also, the thrust-plate B may have hardened or chilled bearing-surfaces.

G represents a casing which is secured to the plate A, preferably in such a manner as to be oil-proof. This casing G is formed so as to inclose the step-plate E, balls D D' $D^2$, thrust-plate B, and pivotal portion $a^2$ $b'$ and may be filled with lubricant through the oil-channel J or in any other suitable manner.

In construction the centers of the raceways C, C', and $C^2$ and E', $E^2$, and $E^3$ are on the radial lines O O O O O O, thus bringing the weight or pressure on the balls, as at $p\ p$, through $p'\ p'\ p'$ to the center of the revolution.

It will be seen from the above description, taken in connection with the drawings, that by forming the bearings and disposing the balls in terraced form or at an angle inclining downward and by employing two or more series of tracks and balls I attain better facilities for lubrication of the parts, less liability for the accumulation of grit between the balls and their several bearings, (inasmuch as it is washed along the incline or moves in that direction,) and a more solid bearing by having the several tracks in contact with the several series of balls for a great portion of their periphery, thus rendering the bearing proof against cutting, denting, or grooving through extraordinary stresses or sudden shocks; also, I provide a bearing which is supported in a lateral and vertical direction, or, in other words, in a line with the axis of the shaft and at any angle thereto.

Another feature incident to my construction is the self-alining property of the bearing parts, and hence the prevention of cramping should the machine settle or any of its parts become out of alinement.

In setting forth this invention I have illustrated certain features of construction and assemblage of parts which I consider best adapted for attaining the object of my invention. I do not, however, wish to be limited to these features, inasmuch as it is apparent to any one skilled in the art that they can easily be modified without departing from the essentials of the construction.

What I claim is—

1. A step or thrust bearing of the type set forth, comprising a rocking thrust-plate provided with two or more ball-races, balls mounted in and adapted to run in said races in connection with a shaft supported by said balls.

2. In a step or thrust bearing of the type set forth, the combination with a rocking thrust-plate provided with two or more ball-races at different elevations, balls mounted in said races and a shaft supported by said balls for the purpose set forth.

3. In a step or thrust bearing of the type set forth, a rocking thrust-plate provided with terraced ball-races, balls mounted and running in said races, a step-plate provided with races adapted to engage with and be supported by said balls; each of said races engaging the balls in such a manner that the lines of stress will converge toward the axial line of said bearing at an angle inclining downward toward the pivotal point.

4. In a step or thrust bearing of the type set forth, the combination with the supporting-plate, of a rocking thrust-plate mounted therein, said thrust-plate having free lateral and rocking motion but being restricted in its rotary motion and having a series of (two or more) ball-races disposed at different elevations; a step-plate having ball-races coincident with the races of the thrust-plate and balls mounted between said races, for the purpose set forth.

Signed by me at Bucyrus, county of Crawford, and State of Ohio, this 7th day of October, 1901.

WILLIAM R. CUNNINGHAM.

Witnesses:
J. C. FITTERER,
ALEX. R. BATLEY.